US011036816B2

(12) United States Patent
Kau et al.

(10) Patent No.: US 11,036,816 B2
(45) Date of Patent: Jun. 15, 2021

(54) SELECTIVE COLLABORATION OF USERS WITHIN A FORUM BASED ON PRIOR ACTIVITY OF THE USERS WITHIN ONE OR MORE FORUMS

(71) Applicant: International Business Machines Corporation, Armonk, NY (US)

(72) Inventors: Christian B. Kau, Mountain View, CA (US); Jeremy R. Fox, Georgetown, TX (US); Liam S. Harpur, Dublin (IE); John C. Rice, West Pennant Hills (AU)

(73) Assignee: International Business Machines Corporation, Armonk, NY (US)

( * ) Notice: Subject to any disclaimer, the term of this patent is extended or adjusted under 35 U.S.C. 154(b) by 56 days.

(21) Appl. No.: 16/421,274

(22) Filed: May 23, 2019

(65) Prior Publication Data
US 2020/0374145 A1   Nov. 26, 2020

(51) Int. Cl.
*G06F 16/9535* (2019.01)
*H04L 12/18* (2006.01)
(Continued)

(52) U.S. Cl.
CPC ..... *G06F 16/9535* (2019.01); *G06Q 30/0282* (2013.01); *H04L 12/1822* (2013.01);
(Continued)

(58) Field of Classification Search
CPC .............. G06F 16/90335; G06F 16/00; G06F 16/9535; G06Q 30/0282
See application file for complete search history.

(56) References Cited

U.S. PATENT DOCUMENTS 7,290,061 B2   10/2007 Lentini et al.
7,774,335 B1   8/2010 Scofield et al.
(Continued)

FOREIGN PATENT DOCUMENTS

CN   103034655 B   8/2016

OTHER PUBLICATIONS

Oprea, E., "11 Google Analytics Tricks to Use for Your Website," Moz Inc., Section 11 Excerpt from 11 Google Analytics Tricks to Use for Your Website, Mar. 1, 2012, 2 pages, retrieved from https://moz.com/blog/11-google-analytics-tricks-to-use-for-your-website.
(Continued)

*Primary Examiner* — Kyung H Shin
(74) *Attorney, Agent, or Firm* — Zilka-Kotab, P.C.

(57) ABSTRACT

A computer-implemented method according to one embodiment includes receiving a first set of inputs from a first plurality of users. A history of interactions and/or collaborations of a first group of users of the first plurality of users is accessed. A latent class model of the first plurality of users is generated using information obtained from the accessing. It is determined from the latent class model whether any of the first plurality of users exceed a predetermined threshold of relatability. Users of the first plurality of users that are determined to exceed the predetermined threshold are allowed access to a generated first state of a forum. Users of the first plurality of users that are determined to not exceed the predetermined threshold and the users of the first plurality of users that are determined to exceed the predetermined threshold are allowed access to a generated second state of the forum.

19 Claims, 4 Drawing Sheets

(51) Int. Cl.
*G06Q 30/02* (2012.01)
*G06F 16/903* (2019.01)
*G06F 16/00* (2019.01)

(52) U.S. Cl.
CPC .......... *H04L 12/1831* (2013.01); *G06F 16/00* (2019.01); *G06F 16/90335* (2019.01)

(56) References Cited

U.S. PATENT DOCUMENTS

| | | | |
|---|---|---|---|
| 7,797,274 B2 | 9/2010 | Strathearn et al. | |
| 8,538,790 B2 | 9/2013 | Nickerson et al. | |
| 8,656,266 B2 | 2/2014 | Cierniak | |
| 8,874,589 B1* | 10/2014 | Liu | G06F 16/9535 707/749 |
| 8,977,649 B1* | 3/2015 | Hassidim | G06Q 30/0282 707/798 |
| 8,990,235 B2 | 3/2015 | King et al. | |
| 9,514,466 B2 | 12/2016 | Jacobson et al. | |
| 2011/0191352 A1* | 8/2011 | Jones | G06F 16/00 707/749 |
| 2014/0006914 A1 | 1/2014 | Visconsi et al. | |
| 2014/0067702 A1 | 3/2014 | Rathod | |
| 2014/0289598 A1 | 9/2014 | Charitos | |
| 2016/0202883 A1 | 7/2016 | Everton et al. | |

OTHER PUBLICATIONS

Heer et al., "Voyagers and Voyeurs: Supporting Asynchronous Collaborative Information Visualization," Conference on Human Factors in Computing Systems (CHI), Apr. 28-May 3, 2007, 10 pages.

Bosch et al., "ScatterBlogs2: Real-Time Monitoring of Microblog Messages through User-Guided Filtering," IEEE Transactions on Visualization and Computer Graphics, vol. 19, No. 12, Dec. 2013, pp. 2022-2031.

Bosch et al., "ScatterBlogs2: Real-Time Monitoring of Microblog Messages through User-Guided Filtering (Abstract)," IEEE Transactions on Visualization and Computer Graphics, vol. 19, No. 12, Dec. 2013, 1 page.

* cited by examiner

SELECTIVE COLLABORATION OF USERS WITHIN A FORUM BASED ON PRIOR ACTIVITY OF THE USERS WITHIN ONE OR MORE FORUMS

BACKGROUND

The present invention relates to multi-user collaboration, and more specifically, this invention relates to selective collaboration of users within a forum based on prior activity of the users within one or more forums.

Forums such as a webpage are typically navigated to by, e.g., users clicking on a link assigned to the webpage, users entering a Universal Resource Locator (URL) into a web-based search bar, users being automatically directed to a forum, etc. Once a user is able to access a forum, user collaboration may be performed on the forum. User collaboration on a forum may be private, e.g., such as on a private network, or public, e.g., such as on a public/open network.

SUMMARY

A computer-implemented method according to one embodiment includes receiving a first set of inputs from a first plurality of users. The first set of inputs correspond to attempts by the first plurality of users to access a forum. A history of interactions and/or collaborations of a first group of users of the first plurality of users is accessed. The history of interactions and/or collaborations of the first group of users includes prior navigation within one or more forums. A latent class model of the first plurality of users is generated using information obtained from the accessing the history of interactions and/or collaborations. The method further includes determining from the latent class model whether any of the first plurality of users exceed a predetermined threshold of relatability. Users of the first plurality of users that are determined to exceed the predetermined threshold of relatability are allowed access to a generated first state of the forum. Users of the first plurality of users that are determined to not exceed the predetermined threshold of relatability and the users of the first plurality of users that are determined to exceed the predetermined threshold of relatability are allowed access to a generated second state of the forum.

A computer program product for selective collaboration of users within a forum based on prior activity of the users within one or more forums according to another embodiment includes a computer readable storage medium having program instructions embodied therewith. The program instructions are readable and/or executable by a computer to cause the computer to perform the foregoing method.

A system according to another embodiment includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
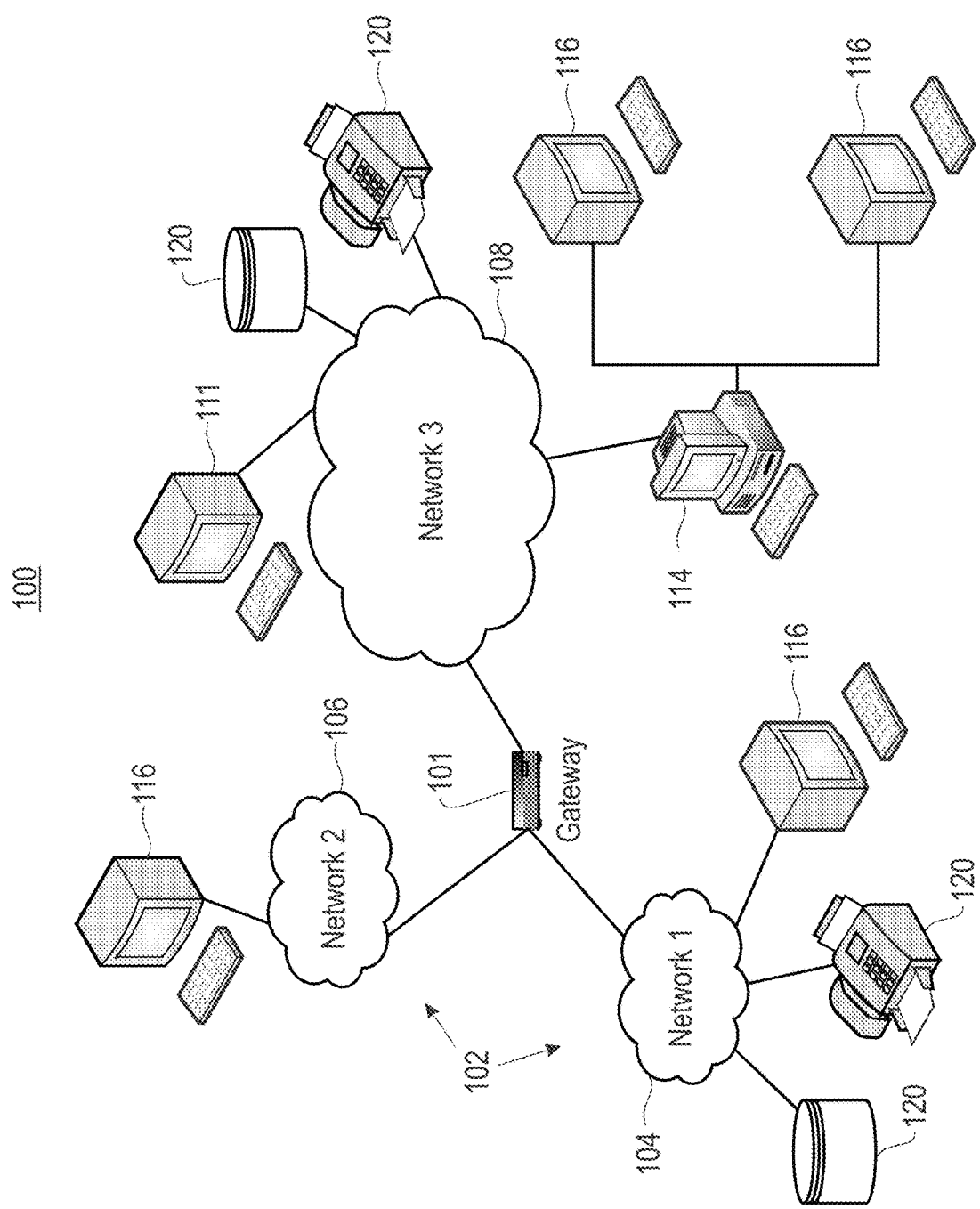
FIG. 1 is a network architecture, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for selective collaboration of users within a forum based on prior activity of the users within one or more forums.

In one general embodiment, a computer-implemented method includes receiving a first set of inputs from a first plurality of users. The first set of inputs correspond to attempts by the first plurality of users to access a forum. A history of interactions and/or collaborations of a first group of users of the first plurality of users is accessed. The history of interactions and/or collaborations of the first group of users includes prior navigation within one or more forums. A latent class model of the first plurality of users is generated using information obtained from the accessing the history of interactions and/or collaborations. The method further includes determining from the latent class model whether any of the first plurality of users exceed a predetermined threshold of relatability. Users of the first plurality of users that are determined to exceed the predetermined threshold of relatability are allowed access to a generated first state of the forum. Users of the first plurality of users that are determined to not exceed the predetermined threshold of relatability and the users of the first plurality of users that are determined to exceed the predetermined threshold of relatability are allowed access to a generated second state of the forum.

In another general embodiment, a computer program product for selective collaboration of users within a forum based on prior activity of the users within one or more forums includes a computer readable storage medium having program instructions embodied therewith. The program instructions are readable and/or executable by a computer to cause the computer to perform the foregoing method.

In another general embodiment, a system includes a processor, and logic integrated with the processor, executable by the processor, or integrated with and executable by the processor. The logic is configured to perform the foregoing method.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
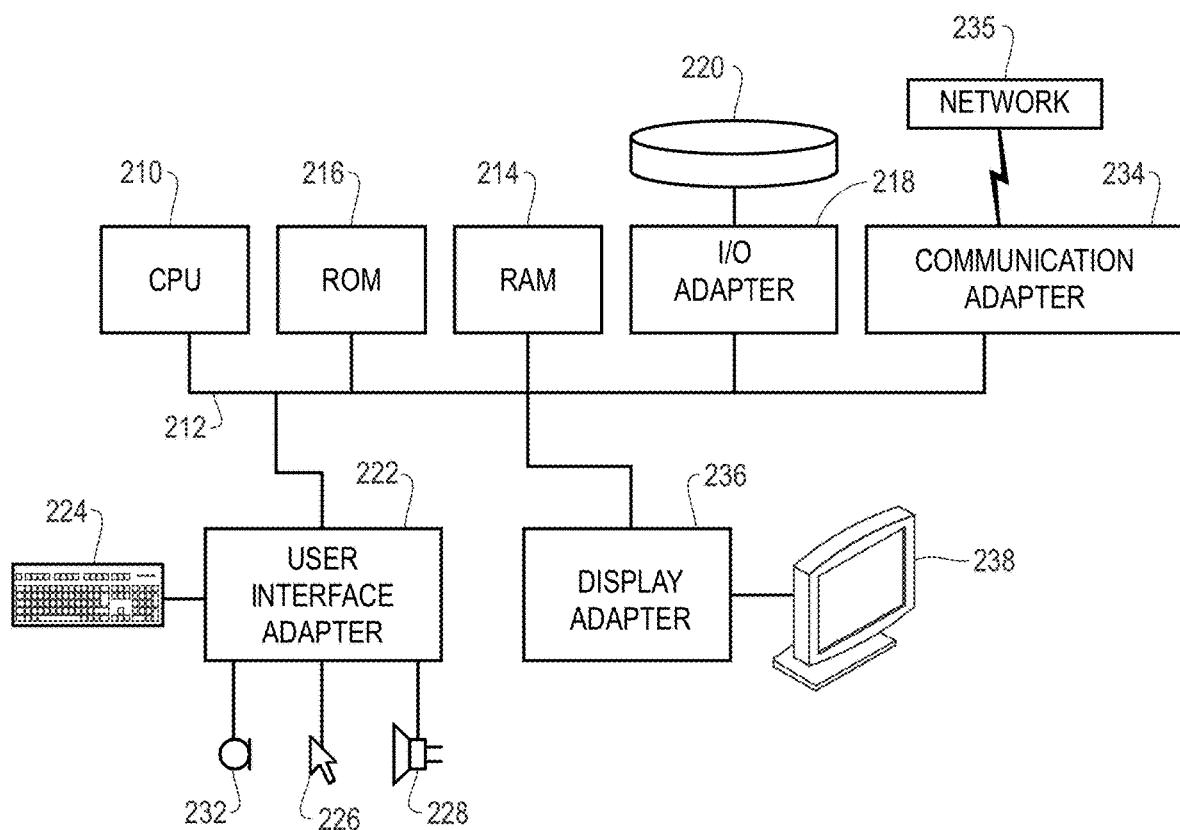
FIG. 2 is a representative hardware environment that may be associated with the servers and/or clients of FIG. 1, in accordance with one embodiment of the present invention.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

As mentioned elsewhere above, forums such as a webpage are typically navigated to by, e.g., users clicking on a link assigned to the webpage, users entering a Universal Resource Locator (URL) into a web-based search bar, users being automatically directed to a forum, etc. Once a user is able to access a forum, user collaboration may be performed on the forum. User collaboration on a forum may be private, e.g., such as on a private network, or public, e.g., such as on a public/open network.

Upon links to a forum being posted to blog and/or other forum, there exists no way to leverage the behaviors of visitors who open such links. For example, subsequent a user posting a link to a web page, multiple users may open the link, however the behavior of such users once accessing the web page associated with the link are not tracked and/or leveraged for promoting user collaboration.

In sharp contrast, various embodiments and approaches described herein include monitoring the behaviors, e.g., navigation, commentary, editing, etc., of users upon accessing a forum and/or the behaviors of users prior to accessing the forum, in order to enable states of the forum that are specific to related users. Such embodiments and approaches enhance the experience and understanding of users that access such states of the forum.

Figure 3:
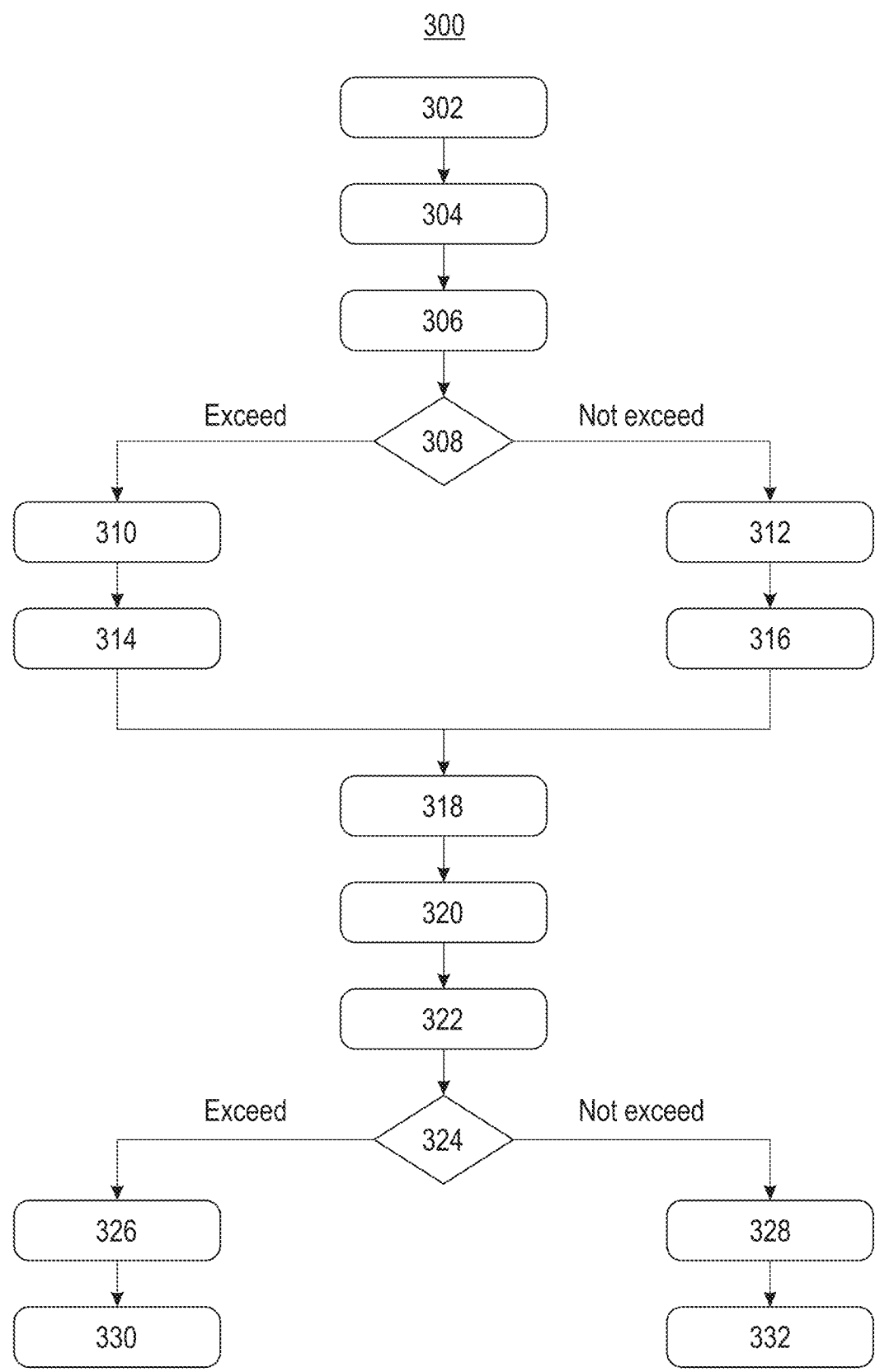
FIG. 3 is a flowchart of a method, in accordance with one embodiment of the present invention.

Now referring to FIG. 3, a flowchart of a method 300 is shown according to one embodiment. The method 300 may be performed in accordance with the present invention in any of the environments depicted in FIGS. 1-2 and 4, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 300.

Illustrative processors include, but are not limited to, a central processing unit (CPU), an application specific integrated circuit (ASIC), a field programmable gate array (FPGA), etc., combinations thereof, or any other suitable computing device known in the art.

It should be prefaced that method 300 is described with respect to a forum. In the current embodiment, a forum may include any type of electronic platform, e.g., a network, a website, a message thread, that one or more users may access. It should also be prefaced that any actions performed with respect to one or more users, e.g., tracking, monitoring, accessing of user history, storing, etc., is preferably performed with the user's permission. For example, in one approach method 300 may be implemented with and/or as an opt-in application, e.g., such as a social forum or community where users post content to collaborate.

Operation 302 of method 300 includes receiving a first set of inputs from a first plurality of users. According to one approach, the first set of inputs may correspond to attempts by the first plurality of users to access a forum, e.g., a request for access. The first set of inputs may be received in response to the first plurality of users attempting to access the forum using any known type of access, e.g., selecting a posted URL that is a URL address of the forum, inputting user credentials in a web-portal, pasting a URL into a web-based search bar, users being automatically directed to a forum, a user selecting a link that is logically tied to the forum, etc.

A history of interactions and/or collaborations of a first group of users of the first plurality of users may be accessed, e.g., see operation 304 of method 300. According to one approach, the history of interactions and/or collaborations of a first group of users of the first plurality of users may detail communication/exchanges of information that previously occurred between between at least some of, e.g., the first plurality of users, users that have at least attempted to access the forum and that have common interests, users that have previously been allowed access to one or more states of the forum, etc. In another approach, the history of interactions and/or collaborations of the first group of users may include prior navigation events within the forum and/or one or more other forums. For example, in one approach, the history of interactions and/or collaborations may include information detailing navigational path(s) of one or more users throughout, e.g., comments such as comments of collaboration groups of users, selectable options of a forum, a listing of users that have access to a given forum, websites that a user visited prior to navigating to the forum, etc.

In some approaches, the history of interactions and/or collaborations of the first group of users of the first plurality of users may include a known type of time stamp information that details a temporal breakdown of increments of time spent at one or more predetermined navigation points along such navigational path(s). Similarly, according to another approach in which the first set of inputs received from the first plurality of users correspond to the users selecting a link to the forum on a blog entry, method 300 may include performing an analysis for determining the times that the link was opened, and monitoring behavior, e.g., likes, comments, mentions, proximate activity in parallel applications, etc., of the users upon opening the link. Such monitoring may include determining, e.g., based on user activity, portions of the forum that are of a greatest interest to each user. A virtual commentary thread may be created detailing the determinations, which may be posted on and/or saved to, e.g. the first state of the forum, the second state of the forum, the original blog entry, the history of interactions and/or collaborations of the first group of users of the first plurality of users, etc.

In some other approaches, the history of interactions and/or collaborations of the first group of users may additionally and/or alternatively include profile information for one or more of the users. For example, the profile information may include documentation of prior activity of one or more users within, e.g., social groups, webpages, blog entries, fora messages, etc.

According to some further approaches, the history of interactions and/or collaborations of the first group of users may additionally and/or alternatively include information detailing how one or more of the plurality of users navigated to the forum. Such information may additionally and/or alternatively be determined, e.g., using a known type of social/authentication method. For example, using a known type of authentication method, it may be determined that one or more of the users attempting to access the forum are, e.g., engineers navigating to an application framework, members of management navigating to new features/benefits, new users navigating through tutorials, a combination of users navigating through comments and collaboration, etc.

A latent class model of the first plurality of users may be generated using information obtained from the accessing the history of interactions and/or collaborations, e.g., see operation 306 of method 300. In some approaches the latent class model may be of a known type. The latent class model may be generated in order to determine whether different users would potentially benefit from accessing a unique state of the forum as opposed to only having access to a universal/default state of the forum. In other words, in order to provide a more collaborative and user specific state of the forum for each of the users, a comparative analysis may be performed on the history of interactions and/or collaborations of the first plurality of users as it relates to the current forum that the first plurality of users are attempting to access. For example, the latent class model may be used to propose or prime collaboration states of the forum, e.g., an online forum, a message board, a group chat session, etc., for a specified user and/or groups of users that are determined, e.g., from the latent class model, would collaboratively benefit from such states. States of the forum will be described in greater detail elsewhere below, however, for context, each state of the forum may differ from one another in any one or more aspects, e.g., user access, communication functionalities, physical appearance, options, etc.

In some approaches, it may be determined from the latent class model whether any of the first plurality of users exceed a predetermined threshold of relatability, e.g., see decision 308. The determining of decision 308 may be performed using any known type of comparative analysis. Moreover, the predetermined threshold of relatability may be based on any one or more variables of the information obtained from the accessing the history of interactions and/or collaborations. For example, it may be determined from the latent class model that userB and userC have an eighty-seven percent probability of being interested in a given topic. Moreover, it may also be determined from the latent class model that userB and userC both have an eighty percent probability of not fully understanding content associated with the given topic, and determined from the latent class model that userB and userC both have an sixty percent similar prior navigation to reach the forum, e.g., similar prior navigation within a predetermined number of most recent navigational actions prior to requesting access to the forum. Provided that the predetermined threshold of relatability is less than an eighty-seven percent probability of being interested in a given topic and/or less than an eighty percent probability of not understanding contend associated with the given topic and/or less than a sixty percent threshold of similar prior navigation, userB and userC may be determined to exceed the predetermined threshold of relatability.

According to another example, assuming that the predetermined threshold of relatability is based on previous user navigation within the forum, users may be determined to exceed the predetermined threshold of relatability in response to the latent class model indicating that the users have previously performed a predefined amount of matching navigation while previously accessing the forum and/or while navigating to the forum. In a further example, assuming that the predetermined threshold of relatability is based on user interests within social groups, each user of the first plurality of users having at least five matching social group interests with another user of the first plurality of users may be determined to exceed the predetermined threshold of relatability.

Users of the first plurality of users that are determined to exceed the predetermined threshold of relatability may in some approaches be allowed access to a generated first state of the forum, e.g., see operation 310. The first state of the forum may be generated and/or permitted to be accessed by users of the first plurality of users that are determined to exceed the predetermined threshold of relatability in order to thereby likely provide a beneficial interaction for such users. For example, in some preferred approaches the first state of the forum may include any one or more aspects, e.g., user access, communication functionalities, physical appearance, options, etc., that are pre-associated with users that are determined to exceed the predetermined threshold of relatability. According to a more specific approach, the first state of the forum may be a group chat session and/or video conference session that is configured to be used and/or accessed in conjunction with another state of the forum that users that are determined to not exceed the predetermined threshold of relatability are allowed to access, e.g., see operation 312.

In yet some other approaches, the first state of the forum may additionally and/or alternatively include information about the state of the forum and/or users allowed access to the first state of the forum, e.g., a listing of users that also requested and are allowed access to the first state of the forum, a listing of how each user that is allowed access to the first state of the forum discovered/navigated to the forum, contact information for at least some users that are allowed access to the first state of the forum (which may not otherwise be available to users that are not allowed access to the first state of the forum), etc.

According to some other approaches, the first state of the forum may additionally and/or alternatively include content that is predetermined to be related to one or more types of user information used in a determination of whether or not the users exceed the predetermined threshold of relatability. For example, in one approach in response to determining one or more topics of forums that one or more users previously navigated to, e.g., as recorded in the history of interactions and/or collaborations of the users, the content of the first state of the forum may include, e.g., online resources that are related to the topics, a communication thread that previously occurred between users of the first plurality of users and/or other users that discusses the topics, etc.

Users of the first plurality of users that are determined to not exceed the predetermined threshold of relatability and/or users of the first plurality of users that are determined to exceed the predetermined threshold of relatability may in some approaches be allowed access to a generated second state of the forum, e.g., see operation 312. The generated second state of the forum may include aspects, e.g., user access, communication functionalities, physical appearance, options, etc., that are pre-associated with users that are determined to not exceed the predetermined threshold of relatability. Aspects of the second state of the forum may be different than aspects of the first state of the forum. However, because users that are allowed access to the second state of the forum but not allowed access to the first state of the forum may, based on determinations from the latent class model, not have related interests, in some approaches the first state of the forum may be a predefined universal/default state of the forum.

In some approaches, allowing access to the first state of the forum and/or the second state of the forum may include outputting notifications to at least some of the first plurality of users that each specify state(s) of the forum that the respective user is allowed to access. In another approach, allowing access to the first state of the forum and/or the second state of the forum may additionally and/or alternatively include outputting one or more states of the forum to users in accordance with the states that such users are allowed to access.

In yet another approach, allowing access to the first state of the forum and/or the second state of the forum may additionally and/or alternatively include suggesting to one or more users of the first plurality of users one or more states of the forum that the one or more users are allowed to access. According to a more specific approach, a user suggestion of a state of the forum to access may include a listing of other users that have access to the state of the forum. In another approach, the user suggestion of a state of the forum to access may additionally and/or alternatively include one or more reasons specifying why access to the forum was suggested to the user. In yet another approach, the user suggestion of a state of the forum to access may additionally and/or alternatively preface one or more characteristics, e.g., features, of the state of the forum that may be different from other states of the forum.

It should be noted that although various approaches described herein describe the forum as including only two generated states, the forum may include any number of states. For example, in some approaches, access to states of the forum may be allowed in accordance with determined levels of relatability with other users, e.g., determined from the latent class model. According to a more specific example, users of the first plurality of users may be allowed access to the first state of the forum in response to a determination that the users have a 0%-33% scoring of relatability, users of the first plurality of users may be allowed access to the second state of the forum in response to a determination that the users have a 34%-66% scoring of relatability, and users of the third plurality of users may be allowed access to a third state of the forum in response to a determination that the users have a 67%-100% scoring of relatability. In other words, each scoring of relatability may be pre-associated with at least one state of the forum.

User inputs, e.g., commenting, editing, posting, scrolling, accessing, etc., received from a user while accessing one or more states of the forum may be shared on one or more states of the forum as specified in one or more sharing conditions of the forum. In some approaches the inputs may be explicit, e.g., video or text comments, user selections, audio comments, etc. The inputs may additionally and/or alternatively be implicit, e.g., facial expressions detected on the user, user proximate activity (such as a detected amount of time that the user not accessing/viewing one or more states of the forum while having access to such states of the forum), a detection of laughter, etc.

For example, according to one approach, an input may be received from a first user of the first plurality of users (that is allowed access to the first state of the forum and the second state of the forum) while the first user is accessing the first state of the forum and the second state of the forum. In response to receiving the user input, method 300 may optionally include notifying the first user of current sharing conditions of the forum. The current sharing conditions of the forum may include any predetermined setting that allows for sharing the user input to one or more states of the forum and/or other locations, e.g., the history of interactions and/or collaborations of the user, storage, another forum, etc. Notifying the first user of current sharing conditions of the forum may allow the first user to determine whether the current sharing conditions are acceptable or whether the user would prefer that the input be additionally and/or alternatively shared according to different sharing conditions. For example, in one approach, in response to receiving an indication from the first user specifying sharing conditions of the forum that are different than the current sharing conditions of the forum, the input received from the first user may be shared in accordance with the sharing conditions of the forum received from the first user. In contrast, in response to not receiving an indication from the first user specifying sharing conditions of the forum that are different than the current sharing conditions of the forum and/or in response to receiving approval of the current sharing conditions, the input received from the first user may be shared in accordance with the current sharing conditions of the forum.

As will now be described below, in some approaches method 300 optionally includes tracking and/or storing user activity, e.g., inputs, navigation, modification, collaboration, etc., of users of the first plurality of users within one or more states of the forum, e.g., see operations 314-316, in order to thereafter incorporate such information in determinations of user access of states of the forum, e.g., see operations 318-328.

For example, according to some approaches, modification (s) to and/or editing of the first state of the forum and/or the second state of the forum by a second group of users of the first plurality of users may be tracked, e.g., using a known technique for monitoring the behavior of users. The tracked modification(s) and/or editing may be stored in the history of interactions and/or collaborations of the second group of users, e.g., see operations 314-316 of method 300. Accordingly, a subsequent accessing of the history of interactions and/or collaborations of the second group of users will include the additional information, which may thereby be used for determining which states one or more users may access. As a result, users are automatically assisted discovering content of a forum that is personalized to their interests upon requesting access to a forum. This results in relatively lesser navigation time and extents that such users would otherwise perform if all users were only allowed access to a universal state of a forum upon requesting access to the forum.

According to another approach, navigations of a second group of users of the first plurality of users on the first state of the forum and/or on the second state of the forum may be tracked. Tracking the navigations of a user of the second group of users accessing one or more states of the forum may include determining and/or recording any navigational path that the user undertakes while accessing state(s) of the forum, e.g., determining and/or recording sub-portions of the state(s) of the forum that the accessing user allocates a majority portion of time viewing, determining and/or recording a context/topic of communications between the user and another user, determining and/or recording a number of times that the user accesses state(s) of the forum within a duration that the users is allowed access to the state(s) of the forum, etc. The tracked navigations may be stored to the history of interactions and/or collaborations of the second group of users, e.g., see operations 314-316 of method 300.

It should be noted that tracking and saving navigations and/or modification(s)/editing of users of the first plurality of users is not implemented in conventional user systems. In other words, in conventional user systems for example, once a user clicks on a link URL, the user is merely directed to and views the URL. In sharp contrast, various embodiments and approaches described herein utilize such tracked and stored information for improving user collaboration on a forum based on a determined relatability of subsequent users. For example, in response to users of the first plurality thereafter again accessing and/or attempting to access the forum or upon users of a different plurality of users attempting to access the forum, the stored information may be utilized for generating/selectively allowing access to different states of the forum with content/features that the different users attempting to access the forum would be otherwise be likely to navigate to.

As will be described below, a determination of access allowed to users of the second plurality of users requesting access to the forum may incorporate the saved tracked navigations and/or tracked modification(s)/editing of users of the first plurality of users.

Subsequent saving the tracked navigations to the history of interactions and/or collaborations of the second group of users of the first plurality of users, according to some approaches, a second set of inputs may be received from a second plurality of users, e.g., see operation 318. In such approaches the second set of inputs may correspond to attempts by the second plurality of users to access a forum, e.g., such as the forum having the first state and the second state.

In some approaches, the second plurality of users may include one or more users of the first plurality of users. In other words, in some approaches operations 318-328 of method 300 may pertain to users of the first plurality of users that would benefit from being allowed access to different states of the forum based on actions, e.g., interactions, collaborations, navigation, etc., performed by the users subsequent a most recent allocation of access.

In some approaches, the second set of inputs may be received while one or more users of the first plurality of users are allowed access to and/or are currently accessing one or more states of the forum. According to some other approaches, the second set of inputs may be received subsequent a terminating of one or more of the states of the forum (described in greater detail elsewhere below).

In order to facilitate access of one or more states of the forum that would likely be conducive to collaboration and/or of interest to the users of the second plurality of users, history of interactions and/or collaborations may be accessed, e.g., see operation 320. For example, in one approach, the history of interactions and/or collaborations of the second group of users of the first plurality of users may be accessed. The history of interactions and/or collaborations of the second group of users of the first plurality of users may provide information regarding previously navigated to portions of the states of the forum. Moreover, a history of interactions and/or collaborations of the second plurality of users may additionally and/or alternatively be accessed.

A second latent class model, e.g., of a known type, of the second plurality of users may be generated using information obtained from the accessing the history of interactions and/or collaborations of the second group of users of the first plurality of users and/or the history of interactions and/or collaborations of the second plurality of users, e.g., see operation 322.

In some approaches it may be determined from the second latent class model whether any of the second plurality of users exceed the predetermined threshold of relatability with the second group of users of the first plurality of users, e.g., see decision 324. Such a determination may be made in order to initially promote access to users of the second plurality of users to one or more states of the forum that may have been previously navigated to by the second group of users of the first plurality of users that have similar user histories. This likely results in users having to navigate less within the forum to access states of the forum that are of interest to the users and/or facilitate user collaboration.

In some other approaches, decision 324 may additionally and/or alternatively include determining whether any users of the second plurality of users exceed a predetermined threshold of relatability with other users of the second plurality of users. Such a determination may be performed in order to determine which users of the second plurality of users would potentially benefit, e.g., collaboratively, from being allowed access to common states of the forum at the same time.

Users of the second plurality of users that are determined to exceed the predetermined threshold of relatability with the second group of users of the first plurality of users and/or with other users of the second plurality of users may be allowed access to the first state of the forum, e.g., see operation 326. According to some preferred approaches, the first state of forum may be a most current state of the first state of the forum. For example, the first state of the forum may be currently being accessed and/or currently being modified by one or more users of the first plurality of users. In another example, the first state of the forum may have been previously terminated, e.g., due to inactivity of users of the first plurality of users. In such an example, the first state of the forum may be revived for accessing by at least the users of the second plurality of users that are determined to exceed the predetermined threshold of relatability with the second group of users of the first plurality of users and/or with other users of the second plurality of users.

In contrast, users of the second plurality of users that are determined to not exceed the predetermined threshold of relatability with the second group of users of the first plurality of users and/or with other users of the second plurality of users may be allowed access to the second state of the forum, e.g., see operation 328. In some approaches, users of the second plurality of users that are determined to exceed the predetermined threshold of relatability with the second group of users of the first plurality of users and/or with other users of the second plurality of users may additionally be allowed access to the second state of the forum.

In some approaches method 300 optionally includes tracking and/or storing user activity, e.g., inputs, navigation, modification, collaboration, etc., of users of the second plurality of users within one or more states of the forum in order to thereafter incorporate such information in determinations of user access of states of the forum, e.g., see operations 330-332.

Method 300 may in some approaches include incorporating input of a creator of a forum into management of user access to different states of the forum. For example, assume that userA previously created BlogPostA that is accessed via URL2 which is posted on a blog page. In this example, method 300 may optionally include receiving additional content from userA on URL2, e.g., either as a forced overlay or via permission of the owner of URL2, to give more context to the content of states of the forum. The added context may be furthermore incorporated into the latent class model for more accurately determine which state(s) of the forum a given user would likely benefit from accessing. Input from the creator of the forum and/or context received from the creator of the forum may additionally and/or alternatively be used for determining where inputs of users accessing one or more states of the forum are to be saved, e.g., such as to the blogpost that includes a URL to the forum, to the URL, to a predetermined memory module, etc. Accordingly, in one approach a URL may include one or more comments/like sections, e.g., DefaultBlogPostA<saved to BlogPostA>, BlogPostA_URL2_context<saved to URL2>, BlogPostA_URL3_context<saved to BlogPostA_contex>, BlogPostA_URL4_context, etc., at which such content may be saved.

At any time and/or for any reason method 300 may include terminating one or more states of the forum. As will now be described, in some preferred approaches, termination of one or more states of the forum is performed in order to sustain user collaboration within the forum and/or promote user interests within states of the forum that users are allowed access to.

In some approaches a termination of one or more states of the forum may be performed in response to a lack of and/or a decrease in user activity. For example, in some approaches the first state of the forum may be terminated in response to a normal Gaussian distribution model of activity of the users allowed access to the first state of the forum falling below a predetermined threshold of activity.

According to another approach, the normal Gaussian distribution model may be used to track a decay rate of user activity within one or more states of the forum and a termination window may be moved one or more times to match the expected decay rate. For example, assume that the first state of the forum is a group chat session that includes userB, userC, userD and userE. A window for commenting within the group chat session may be time boxed based on the normal Gaussian distribution model of activity, e.g. userB, userC, userD and userE have a 95th percentile of accessing URL2 from BlogPostA within 32 hours and therefore the window of opportunity of other users may be set to 45 hours.

The activity of the users may consider any one or more types of user activity, e.g., user navigation, user commenting, user modification, etc. For example, assuming that a user has access to the first state and the second state of the forum, a normal Gaussian distribution model of activity of the users allowed access to the first state of the forum may decrease in response to determining that the user's average viewing time on the first state of the forum has decreased while the user's average viewing time on the second state of the forum has increased.

Terminating the first state of the forum may in one approach include making a most recent state of the first state of the forum available in a most recent state of the second state of the forum. In such an approach, terminating the first state of the forum may additionally and/or alternatively include not allowing the first plurality of users to access the first state of the forum.

In some approaches, the most recent state of the first state of the forum may be automatically incorporated into the second state of the forum, e.g., such as implemented in an update of the second state of the forum. In some other approaches, users that are allowed access to the second state of the forum may be notified and/or be output a request that surveys the users that are allowed access to the second state of the forum whether or not to add the terminated first state of the first forum in the second state of the forum. In response to determining that a predetermined number of surveyed users, e.g., a majority of the surveyed users, accept the addition of the terminated first state of the forum in the second state of the forum, the terminated first state of the forum may be added in the second state of the forum. In contrast, in response to determining that a predetermined number of surveyed users, e.g., a majority of the surveyed users, do not accept the addition of the terminated first state of the forum in the second state of the forum, the terminated first state of the forum may not be added in the second state of the forum.

According to some other approaches, terminating the first state of the forum may additionally and/or alternatively include storing a most recent state of the first state of the forum, and not allowing the first plurality of users to access the first state of the forum. The terminated first state of the forum may in some approaches be revived, e.g., in response to the normal Gaussian distribution model of activity of the users allowed access to the first state of the forum increasing, in response to determining that discussions between users on the second state of the forum are related to the terminated first state of the forum, in response to receiving one or more requests for access to the terminated first state of the forum, in response to a determination from a latent class model of one or more users requesting access to a forum indicating that the users may be interested in and/or may potentially benefit from being allowed access to the terminated first state of the forum, in response to prior navigation performed by one or more users requesting access to a forum matching navigations (to a predetermined degree) of at least one user that previously was allowed access to the now terminated first state of the forum, etc.

Figure 4:
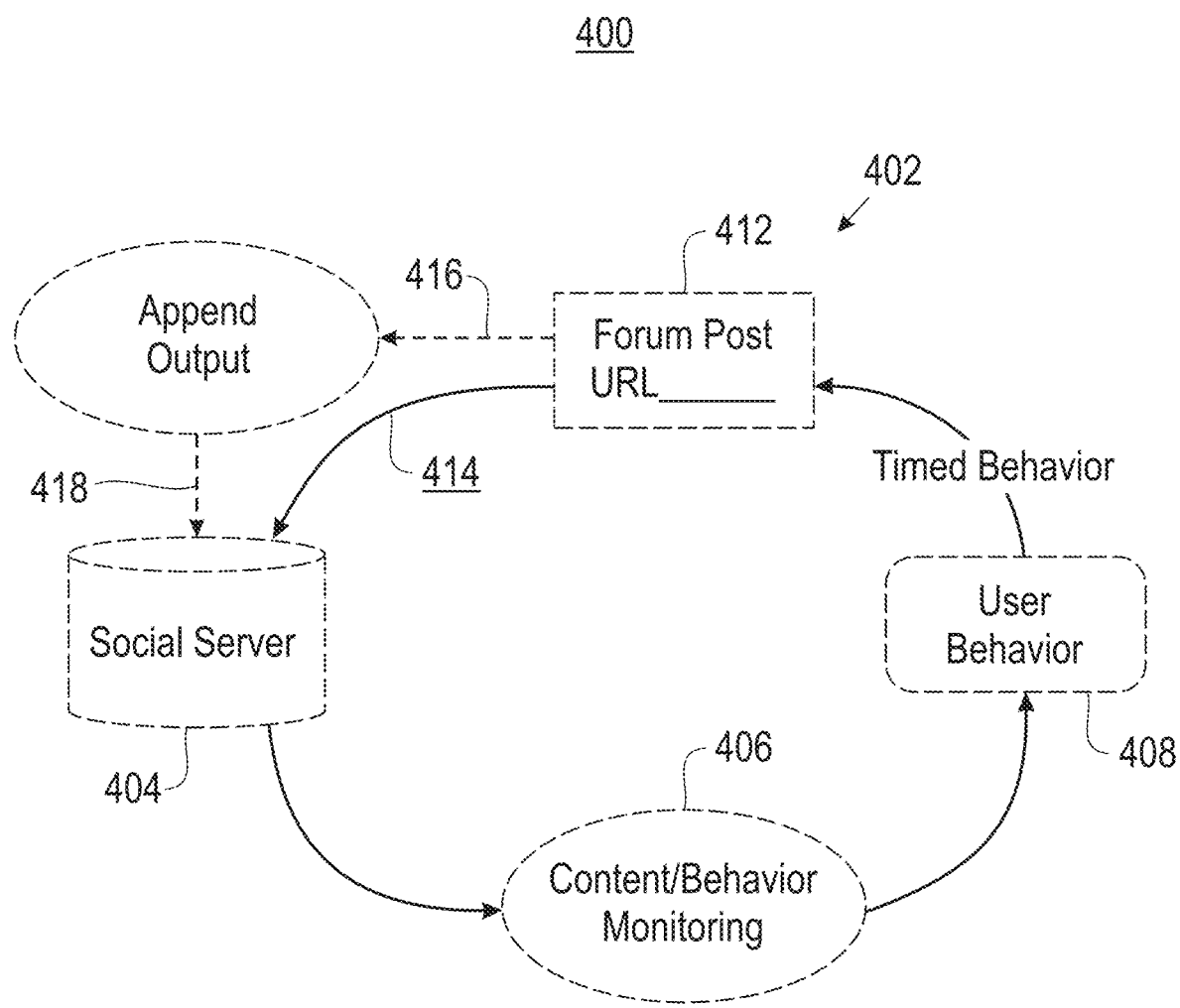
FIG. 4 is a process of incorporating variables for selective collaboration of users within a forum, wherein at least one of the variables includes prior activity of the users within one or more forums, in accordance with one embodiment of the present invention.

As will now be detailed in FIG. 4, various embodiments and approaches described herein may be proactive and/or reactive. For example, as described above, method 300 may be based on a history of interactions and/or collaborations of users. However, as also detailed in method 300 and as will be described below, the allowance of access to users to one or more states of the forum may be based on monitoring performed on users once the users are allowed to and access one or more states of the forum.

FIG. 4 depicts a process 400 of incorporating variables for selective collaboration of users within a forum based on prior activity of the users within one or more forums, in accordance with one embodiment. As an option, the present process 400 may be implemented in conjunction with features from any other embodiment listed herein, such as those described with reference to the other FIGS. Of course, however, such process 400 and others presented herein may be used in various applications and/or in permutations which may or may not be specifically described in the illustrative embodiments listed herein. Further, the process 400 presented herein may be used in any desired environment.

It should be prefaced that any actions performed with respect to one or more users, e.g., tracking, monitoring, accessing of user history, storing, etc., is preferably performed with the user's permission.

Process 400 includes variables 402 which may be considered for enabling selective collaboration of users within a forum based on prior activity of the users within one or more forums. For example, in response to receiving a first set of inputs from a first plurality of users, a history of interactions and/or collaborations of a first group of users of the first plurality of users may be accessed. For example, the history may be accessed on a member specific platform, e.g., see social server module 404. The history may additionally and/or alternatively be accessed from content/behavior monitoring, e.g., see content/behavior monitoring module 406.

A latent class model of the first plurality of users may be generated subsequent the accessing of the history of interactions and/or collaborations of the first group of users of the first plurality of users. In some approaches the latent class model may be generated using information obtained from the accessing the history of interactions and/or collaborations. It may be determined from the latent class model whether any of the first plurality of users exceed a predetermined threshold of relatability.

In some approaches, access to a generated first state of the forum may be allowed to users of the first plurality of users that are determined to exceed the predetermined threshold of relatability. Moreover, access to a generated second state of the forum may be allowed to users of the first plurality of users that are determined to not exceed the predetermined threshold of relatability and to the users of the first plurality of users that are determined to exceed the predetermined threshold of relatability.

User inputs such as user content/behavior may be monitored, e.g., see content/behavior monitoring module 406, upon the users being allowed access to one or more states of the forum. Any monitored user inputs may be used for adjusting access allowed to users for one or more of the states of the forum. For example, in some approaches, a temporal monitoring of user behavior, e.g., see user behavior module 408, may be used for determining whether to terminate one or more states of the forum.

A given state of the forum may be adjusted at any time based on the monitoring described elsewhere above. For example, because information obtained during such monitoring may be added to a history of interactions and/or collaborations of the user, ongoing determinations may be made as to whether access allowed to the user should be modified in view of the actions that the user has performed since being allowed access to one or more states of the forum. For example, note that a state of the forum, e.g., see forum post URL_412 receives monitoring information of a user that is allowed access to the forum post URL_412. Based on the monitoring of the user once the user is allowed access to the forum post URL_412, in one approach, an output of the state of the forum post URL_412 and/or state(s) that the user is allowed to access may be amended in response to determining, e.g., from the latent class model, that the user no longer exceeds one or more predetermined thresholds of relatability, e.g., see logical arrow 416 of process 400. In another approach, based on the monitoring of the user once the user is allowed access to the forum post URL_412, an output of the state of the forum post URL_412 and/or state(s) that the user is allowed to access may be amended in response to determining, e.g., from the latent class model, that the user exceeds a second predetermined threshold of relatability, e.g., that is relatively stricter than a previously considered predetermined threshold of relatability. In response to determining that the user exceeds a second predetermined threshold of relatability, additional collaboration/interaction spaces, e.g., a second state of the forum, a third state of the forum, a fourth state of the forum, etc., may be generated, and the user may be allowed access to one or more of such states of the forum, e.g., see logical arrow 418 leading from Amended Output.

In contrast, in some approaches, based on the monitoring of the user once the user is allowed access to the forum post URL_412, in one approach, an output of the state of the forum post URL_412 and/or state(s) that the user is allowed to access may not be amended in response to determining, e.g., from the latent class model, that the user continues to exceed one or more predetermined thresholds of relatability, e.g., see logical arrow 414 of process 400.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    receiving a first set of inputs from a first plurality of users, wherein the first set of inputs correspond to attempts by the first plurality of users to access a forum;
    accessing a history of interactions and/or collaborations of a first group of users of the first plurality of users, wherein the history of interactions and/or collaborations of the first group of users includes prior navigation within one or more forums;
    generating a latent class model of the first plurality of users using information obtained from the accessing the history of interactions and/or collaborations;
    determining from the latent class model whether any of the first plurality of users exceed a predetermined threshold of relatability;
    allowing access to a generated first state of the forum to users of the first plurality of users that are determined to exceed the predetermined threshold of relatability;
    allowing access to a generated second state of the forum to users of the first plurality of users that are determined to not exceed the predetermined threshold of relatability and to the users of the first plurality of users that are determined to exceed the predetermined threshold of relatability; and
    terminating the first state of the forum in response to a normal Gaussian distribution model of activity of the users that are allowed access to the first state of the forum falling below a predetermined threshold of activity.

2. The computer-implemented method of claim 1, wherein the first state of the forum is a group chat session, wherein terminating the first state of the forum includes: making a most recent state of the first state of the forum available in a most recent state of the second state of the forum, and not allowing the first plurality of users to access the first state of the forum.

3. The computer-implemented method of claim 1, wherein terminating the first state of the forum includes: storing a most recent state of the first state of the forum, and not allowing the first plurality of users to access the first state of the forum, wherein the history of interactions and/or collaborations of the first group of users includes time stamp information that details a temporal breakdown of increments of time spent at one or more predetermined navigation points along the prior navigation of the first group of users.

4. The computer-implemented method of claim 1, wherein the first state of the forum is a group chat session that is configured to be used and/or accessed in conjunction with the second state of the forum by users that have access to the first state and the second state of the forum, wherein the first state of the forum includes information that lists how each of the users allowed access to the first state of the forum discovered/navigated to the forum.

5. The computer-implemented method of claim 4, comprising:
    suggesting, to each user of the first group of users, one or more of the states of the forum that the user of the first group of users is allowed access to, wherein the suggestion specifies why access to the forum was suggested to the user of the first group of users;
    receiving an input from a first user that is allowed access to the first state of the forum and the second state of the forum;
    notifying the first user of current sharing conditions of the forum;
    in response to receiving an indication from the first user specifying sharing conditions of the forum that are different than the current sharing conditions of the forum, sharing input received from the first user in accordance with the sharing conditions of the forum received from the first user; and
    in response to not receiving an indication from the first user specifying sharing conditions of the forum that are different than the current sharing conditions of the forum, sharing the input received from the first user in accordance with the current sharing conditions of the forum.

6. The computer-implemented method of claim 1, comprising:

receiving user inputs from the users of the first plurality of users while the users of the first plurality of users access the states of the forum;

sharing the user inputs on one or more of the states of the forum as specified in one or more sharing conditions of the forum;

tracking navigations of a second group of users of the first plurality of users on the first state of the forum and/or on the second state of the forum;

storing the tracked navigations to the history of interactions and/or collaborations of the second group of users;

receiving a second set of inputs from a second plurality of users, wherein the second set of inputs correspond to attempts by the second plurality of users to access the forum;

accessing the history of interactions and/or collaborations of the second group of users of the first plurality of users and/or a history of interactions and/or collaborations of the second plurality of users;

generating a second latent class model of the second plurality of users using information obtained from the accessing the history of interactions and/or collaborations of the second group of users of the first plurality of users and/or the history of interactions and/or collaborations of the second plurality of users;

determining from the second latent class model whether any of the second plurality of users exceed the predetermined threshold of relatability with the second group of users of the first plurality of users;

allowing access to the first state of the forum to users of the second plurality of users that are determined to exceed the predetermined threshold of relatability with the second group of users of the first plurality of users; and allowing access to the second state of the forum to users of the second plurality of users that are determined to not exceed the predetermined threshold of relatability with the second group of users of the first plurality of users and to the users of the second plurality of users that are determined to exceed the predetermined threshold of relatability with the second group of users of the first plurality of users.

7. The computer-implemented method of claim 5, wherein the suggestion prefaces one or more characteristics of the first state of the forum that are different from the second state of the forum, and comprising:

tracking modification(s) to and/or editing of the first state of the forum and/or the second state of the forum by a second group of users of the first plurality of users; and storing the tracked modification(s) and/or editing in the history of interactions and/or collaborations of the second group of users.

8. A computer program product for selective collaboration of users within a forum based on prior activity of the users within one or more forums, the computer program product comprising a computer readable storage medium having program instructions embodied therewith, the program instructions readable and/or executable by a computer to cause the computer to:

receive, by the computer, a first set of inputs from a first plurality of users, wherein the first set of inputs correspond to attempts by the first plurality of users to access a forum;

access, by the computer, a history of interactions and/or collaborations of a first group of users of the first plurality of users, wherein the history of interactions and/or collaborations of the first group of users includes prior navigation within one or more forums;

generate, by the computer, a latent class model of the first plurality of users using information obtained from the accessing the history of interactions and/or collaborations;

determine, by the computer, from the latent class model whether any of the first plurality of users exceed a predetermined threshold of relatability;

allow, by the computer, access to a generated first state of the forum to users of the first plurality of users that are determined to exceed the predetermined threshold of relatability;

allow, by the computer, access to a generated second state of the forum to users of the first plurality of users that are determined to not exceed the predetermined threshold of relatability and to the users of the first plurality of users that are determined to exceed the predetermined threshold of relatability; and terminate, by the computer, the first state of the forum in response to a determination that a normal Gaussian distribution model of activity of the users allowed access to the first state of the forum has fallen below a predetermined threshold of activity, wherein the determination that the normal Gaussian distribution model of activity of the users allowed access to the first state of the forum has fallen below a predetermined threshold of activity is based on a second determination that an average viewing time on the first state of the forum by the users allowed access to the first state of the forum has decreased while an average viewing time on the second state of the forum by the users allowed access to the first state of the forum has increased.

9. The computer program product of claim 8, wherein terminating the first state of the forum includes: making a most recent state of the first state of the forum available in a most recent state of the second state of the forum, and not allowing the first plurality of users to access the first state of the forum, wherein the predetermined threshold of relatability is based on users of the first plurality of users having previously performed a predefined number of matching navigation actions while navigating to the forum, wherein the predefined number of matching navigation actions are performed prior to the users of the first plurality of users attempting to access the forum, wherein the history of interactions and/or collaborations of the first group of users includes time stamp information that details a temporal breakdown of increments of time spent at one or more predetermined navigation points along the prior navigation of the first group of users, wherein the first state of the forum is a group chat session, wherein the first state of the forum includes information that lists how each of the users allowed access to the first state of the forum discovered/navigated to the forum, and the program instructions readable and/or executable by the computer to cause the computer to: receive user inputs from users of the first plurality of users while the users of the first plurality of users access the states of the forum; and share the user inputs on one or more of the states of the forum as specified in one or more sharing conditions of the forum, wherein the user inputs include facial expressions detected on the users of the first plurality of users.

10. The computer program product of claim 8, wherein terminating the first state of the forum includes: storing a most recent state of the first state of the forum, and not allowing the first plurality of users to access the first state of the forum.

11. The computer program product of claim 8, wherein the first state of the forum is a group chat session that is configured to be used and/or accessed in conjunction with the second state of the forum by users that have access to the first state and the second state of the forum.

12. The computer program product of claim 11, the program instructions
readable and/or executable by the computer to cause the computer to:
receive, by the computer, an input from a first user that is allowed access to the first state of the forum and the second state of the forum;
notify, by the computer, the first user of current sharing conditions of the forum;
in response to receiving an indication from the first user specifying sharing conditions of the forum that are different than the current sharing conditions of the forum, share, by the computer, the input received from the first user in accordance with the sharing conditions of the forum received from the first user; and
in response to not receiving an indication from the first user specifying sharing conditions of the forum that are different than the current sharing conditions of the forum, share, by the computer, the input received from the first user in accordance with the current sharing conditions of the forum.

13. The computer program product of claim 8, the program instructions
readable and/or executable by the computer to cause the computer to:
track, by the computer, navigations of a second group of users of the first plurality of users on the first state of the forum and/or on the second state of the forum;
store, by the computer, the tracked navigations to the history of interactions and/or collaborations of the second group of users;
receive, by the computer, a second set of inputs from a second plurality of users, wherein the second set of inputs correspond to attempts by the second plurality of users to access the forum;
access, by the computer, the history of interactions and/or collaborations of the second group of users of the first plurality of users and/or a history of interactions and/or collaborations of the second plurality of users;
generate, by the computer, a second latent class model of the second plurality of users using information obtained from the accessing the history of interactions and/or collaborations of the second group of users of the first plurality of users and/or the history of interactions and/or collaborations of the second plurality of users;
determine, by the computer, from the second latent class model whether any of the second plurality of users exceed the predetermined threshold of relatability with the second group of users of the first plurality of users;
allow, by the computer, access to the first state of the forum to users of the second plurality of users that are determined to exceed the predetermined threshold of relatability with the second group of users of the first plurality of users; and allow, by the computer, access to the second state of the forum to users of the second plurality of users that are determined to not exceed the predetermined threshold of relatability with the second group of users of the first plurality of users and to the users of the second plurality of users that are determined to exceed the predetermined threshold of relatability with the second group of users of the first plurality of users.

14. The computer program product of claim 8, the program instructions
readable and/or executable by the computer to cause the computer to:
track, by the computer, modification(s) to and/or editing of the first state of the forum and/or the second state of the forum by a second group of users of the first plurality of users; and
store, by the computer, the tracked modification(s) and/or editing in the history of interactions and/or collaborations of the second group of users.

15. A system, comprising:
a processor; and
logic integrated with the processor, executable by the processor, or integrated with and executable by the processor, the logic being configured to:
receive a first set of inputs from a first plurality of users, wherein the first set of inputs correspond to requests by the first plurality of users to access a forum;
access a history of interactions and/or collaborations of a first group of users of the first plurality of users, wherein the history of interactions and/or collaborations of the first group of users includes prior navigation within one or more forums;
generate a latent class model of the first plurality of users using information obtained from the accessing the history of interactions and/or collaborations;
determine from the latent class model whether any of the first plurality of users exceed a predetermined threshold of relatability, wherein the predetermined threshold of relatability is based on users of the first plurality of users having previously performed a predefined number of matching navigation actions while navigating to the forum, wherein the predefined number of matching navigation actions are performed prior to the users requesting access to the forum;
allow access to a generated first state of the forum to users of the first plurality of users that are determined to exceed the predetermined threshold of relatability; and
allow access to a generated second state of the forum to users of the first plurality of users that are determined to not exceed the predetermined threshold of relatability and to the users of the first plurality of users that are determined to exceed the predetermined threshold of relatability.

16. The system of claim 15, wherein the first state of the forum is a group chat session that is configured to be used and/or accessed in conjunction with the second state of the forum by users that have access to the first state and the second state of the forum, wherein the history of interactions and/or collaborations of the first group of users includes time stamp information that details a temporal breakdown of increments of time spent at one or more predetermined navigation points along the prior navigation of the first group of users.

17. The system of claim 15, the logic being configured to:
track navigations of a second group of users of the first plurality of users on the first state of the forum and/or on the second state of the forum;

store the tracked navigations to the history of interactions and/or collaborations of the second group of users;

receive a second set of inputs from a second plurality of users, wherein the second set of inputs correspond to attempts by the second plurality of users to access the forum;

access the history of interactions and/or collaborations of the second group of users of the first plurality of users and/or a history of interactions and/or collaborations of the second plurality of users;

generate a second latent class model of the second plurality of users using information obtained from the accessing the history of interactions and/or collaborations of the second group of users of the first plurality of users and/or the history of interactions and/or collaborations of the second plurality of users;

determine from the second latent class model whether any of the second plurality of users exceed the predetermined threshold of relatability with the second group of users of the first plurality of users;

allow access to the first state of the forum to users of the second plurality of users that are determined to exceed the predetermined threshold of relatability with the second group of users of the first plurality of users; and allow access to the second state of the forum to users of the second plurality of users that are determined to not exceed the predetermined threshold of relatability with the second group of users of the first plurality of users and to the users of the second plurality of users that are determined to exceed the predetermined threshold of relatability with the second group of users of the first plurality of users.

18. The system of claim 15, the logic being configured to:
track modification(s) to and/or editing of the first state of the forum and/or the second state of the forum by a second group of users of the first plurality of users; and store the tracked modification(s) and/or editing in the history of interactions and/or collaborations of the second group of users;

receive user inputs from users of the first plurality of users while the users of the first plurality of users access the states of the forum; and share the user inputs on one or more of the states of the forum as specified in one or more sharing conditions of the forum.

19. The system of claim 18, wherein the user inputs include facial expressions detected on the users of the first plurality of users.

* * * * *